(12) United States Patent
Nasa

(10) Patent No.: US 9,266,994 B2
(45) Date of Patent: Feb. 23, 2016

(54) EXPANDABLE POLYURETHANE COMPOSITION AND MANUFACTURING METHOD OF POLYURETHANE FOAM

(75) Inventor: Toshihisa Nasa, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 713 days.

(21) Appl. No.: 13/131,479

(22) PCT Filed: Jun. 2, 2010

(86) PCT No.: PCT/JP2010/003677
§ 371 (c)(1),
(2), (4) Date: May 26, 2011

(87) PCT Pub. No.: WO2010/140356
PCT Pub. Date: Dec. 9, 2010

(65) Prior Publication Data
US 2011/0263740 A1    Oct. 27, 2011

(30) Foreign Application Priority Data
Jun. 2, 2009 (JP) .................................. 2009-132793

(51) Int. Cl.
C08G 18/32 (2006.01)
C08G 18/30 (2006.01)
C08G 18/34 (2006.01)
C08G 18/38 (2006.01)
C08G 18/48 (2006.01)
C08G 18/66 (2006.01)
C08G 18/72 (2006.01)
C08G 101/00 (2006.01)

(52) U.S. Cl.
CPC .......... *C08G 18/3275* (2013.01); *C08G 18/302* (2013.01); *C08G 18/3296* (2013.01); *C08G 18/348* (2013.01); *C08G 18/3893* (2013.01); *C08G 18/4837* (2013.01); *C08G 18/667* (2013.01); *C08G 18/721* (2013.01); *C08G 2101/005* (2013.01); *C08G 2101/0008* (2013.01); *C08G 2101/0083* (2013.01)

(58) Field of Classification Search
CPC ............. C08G 18/302; C08G 18/3275; C08G 18/3296; C08G 18/348; C08G 18/3893; C08G 18/4837; C08G 18/667; C08G 18/72; C08G 2101/0008; C08G 2101/005; C08G 2101/0083
USPC .......................... 521/130, 131, 154, 164, 170
See application file for complete search history.

(56) References Cited

U.S. PATENT DOCUMENTS

| | | | |
|---|---|---|---|
| 4,282,330 A | 8/1981 | Austin | |
| 5,162,382 A * | 11/1992 | Carswell et al. | 521/51 |
| 5,205,956 A * | 4/1993 | Volkert et al. | 521/131 |
| 5,550,168 A | 8/1996 | Nakamura et al. | |
| 5,977,198 A | 11/1999 | Hettel et al. | |
| 6,737,471 B2 * | 5/2004 | Lorenz et al. | 524/773 |
| 2007/0173556 A1 | 7/2007 | Prange et al. | |
| 2007/0287761 A1 | 12/2007 | Bender et al. | |

FOREIGN PATENT DOCUMENTS

| CA | 2027670 | * | 4/1991 |
|---|---|---|---|
| EP | 0423 594 B1 | | 4/1991 |
| EP | 1 867 669 B1 | | 12/2007 |
| JP | 07-002968 A | | 1/1995 |
| JP | 07-157528 A | | 6/1995 |
| JP | 2001-048947 A | | 2/2001 |
| JP | 2007-332375 A | | 12/2007 |
| JP | 2007-535606 A | | 12/2007 |
| JP | 2008-239725 A | | 10/2008 |

OTHER PUBLICATIONS

JIS K 6401, "Polymeric materials, cellular flexible—Polyurethane foam for load-bearing applications—Specification" Japanese Industrial Standard, 2006.
JIS K 6400-1, "Flexible cellular polymeric materials—Determination of physical properties—Part 1: General rules", Japanese Industrial Standard, 2004.
JIS K 6400-2, "Flexible cellular polymeric materials—Determination of physical properties—Part 2: Hardness (indentation technique) and stress-strain characteristics in compression", Japanese Industrial Standard, 2004.
JIS K 6400-4, "Flexible cellular polymeric materials—Determination of physical properties—Part 4: Compression set and fatigue characteristics", Japanese Industrial Standard, 2004.
JIS K 6400-5, "Flexible cellular polymeric materials—Determination of physical properties—Part 5: tensile strength, elongation at break and tear strength", Japanese Industrial Standard, 2004.
JASO B 408-89, "Test code padding material for automobile seats".

* cited by examiner

*Primary Examiner* — John Cooney
(74) *Attorney, Agent, or Firm* — Foley & Lardner LLP

(57) ABSTRACT

An expandable polyurethane composition contains (A) a polyisocyanate, (B) an active hydrogen containing compound containing (B1) a polyol and (B2) water, and (C) a cross-linking agent composition. The cross-linking agent composition (C) contains a cross-linking agent (C1) and a carboxylic acid (C2). The cross-linking agent (C1) can be selected from an alkanolamine (a) represented by an expression: $H_xR^1{}_yN((R^2O)_nH)_{3-x-y}$, and an aminosilane (b) represented by an expression: $(R^3O)_qR^4{}_{3-q}Si—R^5—(NHCH_2CH_2)_p NR^6R^7$. A content of the cross-linking agent composition (C) is 0.1 parts by mass to 20 parts by mass relative to 100 parts by mass of the active hydrogen containing compound (B), and the containing number of moles of the cross-linking agent (C1) is larger than that of the carboxylic acid (C2). It is possible to delay a reaction without deteriorating a final reactivity, to suppress viscosity increasing just after an injection into a mold, to improve hardness and to attain lowering of a pressure to be applied to a cell communication.

7 Claims, No Drawings

EXPANDABLE POLYURETHANE COMPOSITION AND MANUFACTURING METHOD OF POLYURETHANE FOAM

TECHNICAL FIELD

The present invention relates to an expandable polyurethane composition and a manufacturing method of a polyurethane foam, and in particular, to an expandable composition for polyurethane foam molding to which a specific cross-linking agent is added, and a manufacturing method of a soft polyurethane foam using the expandable composition.

BACKGROUND ART

A soft polyurethane foam is widely used for a cushion material for a vehicle, a furniture mattress, a bedding, general goods, and so on owing to high cushioning properties thereof. The soft polyurethane foam is generally manufactured by reacting an organic polyisocyanate and a compound of two or more kinds (water is generally contained) containing active hydrogen under existence of a catalyst, a foam adjusting agent, and the other additives. Kinds of polyol, kinds of polymer polyol obtained by radical polymerizing acrylonitrile and styrene in the polyol, kinds of primary and secondary polyamines, water, and so on are used as the active hydrogen containing compound.

In general, a method is taken in which starting materials are mixed with a high-pressure foaming apparatus, injected into a mold to form, and thereafter, foamed cells inside the foam are forcibly communicated by using a compressor, in manufacturing of, for example, a foam for a vehicle cushion seat.

In the manufacturing process as stated above, a reaction speed of the foam and a quick removal of mold are necessary because shortening of a molding time, enabling low-energy and so on are required. On the other hand, low-density is required to reduce weight corresponding to a fuel consumption restriction in the manufactured polyurethane foam, particularly in the foam for the vehicle, and therefore, it is desired to enhance hardness of the foam to advance the low-density.

Conventionally, it has been proposed to compound various additives to correspond to the requirements as stated above. A cross-linking agent being one of the additives has a function to improve stability of the foam by reacting with isocyanate and increasing a molecular weight. In general, it is known that an amine-based cross-linking agent is used in the manufacturing of the polyurethane foam. For example, a method to manufacture the polyurethane foam by using an alkanolamine as the cross-linking agent is proposed (refer to Reference 1). However, a foaming reactivity is improved but a viscosity increasing speed also increases according to the increasing of the reactivity, and therefore, there have been problems in which fluidity just after the injection into the mold is lowered, the reaction proceeds before the foam composition diffuses details of the mold, and a failure ratio increases.

Besides, a technology improving physical properties of the polyurethane foam by using a specific catalyst composition composed of a tertiary amine catalyst and 2-methyl-1,3-propanediol is proposed (refer to Reference 2). In the Reference 2, it is described that an open cell (cells in the foam are communicated) effect is enabled because the cells are communicated by a low-pressure at the compression time after the removal of mold. However, there has been a problem in which enough hardness as a high-rebound polyurethane foam cannot be obtained when the low-density is enabled, and so on in this method.

PRIOR ART REFERENCES

Patent References

Reference 1: U.S. Pat. No. 5,977,198 B2
Patent Document 2: US 2007/0287761 A1

SUMMARY OF THE INVENTION

The present invention is achieved to solve the problems as stated above, and an object thereof is to provide an expandable polyurethane composition capable of providing a soft polyurethane foam of which physical properties such as hardness are improved, and further capable of delaying a reaction without deteriorating a final reactivity, suppressing a viscosity increasing during the reaction just after an injection into a mold, and enabling to lower a pressure when cells are communicated by using a compressor in manufacturing thereof.

An expandable polyurethane composition of the present invention comprises: (A) a polyisocyanate; (B) an active hydrogen containing compound containing (B1) a polyol and (B2) water; and (C) a cross-linking agent composition for 0.1 parts by mass to 20 parts by mass relative to 100 parts by mass of the active hydrogen containing compound (B), wherein the cross-linking agent composition (C) comprises at least one kind of a cross-linking agent (C1) selected from an alkanolamine (a) and an aminosilane (b), the alkanolamine (a) being represented by an expression (1):

$$H_x R^1_y N((R^2 O)_n H)_{3-x-y} \qquad (1)$$

(In the expression, the "$R^1$" represents a hydrocarbon group selected from an alkyl group of which carbon number is one to 12, an aryl group, and an aralkyl group, and the "$R^2$" represents an alkyl group of which carbon number is two to four. The "x" is an integer from "0" (zero) to two, the "y" is an integer from "0" (zero) to two, the "x+y" is an integer from "0" (zero) to two, and the "n" is an integer from one to ten.); aminosilanes (b) being represented by an expression (2):

$$(R^3 O)_q R^4_{3-q} Si-R^5-(NHCH_2 CH_2)_p NR^6 R^7 \qquad (2)$$

(In the expression, the "$R^3$" represents an alkyl group of which carbon number is one to six, the "$R^4$" represents a hydrogen group or a methyl group, the "$R^5$" represents a divalent hydrocarbon group of which carbon number is one to ten, and the "$R^6$" and the "$R^7$" represent a hydrogen group or a monovalent hydrocarbon group of which carbon number is one to 20. The "q" is an integer from "0" (zero) to three, the "p" is an integer from "0" (zero) to four.); and at least one kind of a carboxylic acid (C2) represented by an expression (3):

$$X_z-R^8 (COOH)_m \qquad (3)$$

(In the expression, the "$R^8$" represents the hydrocarbon group, and the "X" represents a group selected from a chlorine group, a fluorine group, a bromine group, and a hydroxyl group. The "z" is an integer of one or more, and the "m" is an integer of one or more.), and wherein a content (the number of moles) of the cross-linking agent (C1) is larger than a content (the number of moles) of the carboxylic acid (C2) in the cross-linking agent composition (C).

A manufacturing method of a polyurethane foam of the present invention comprises: using the expandable polyurethane composition of the present invention.

According to the expandable polyurethane composition of the present invention, it is possible to improve hardness without incurring deterioration of physical properties (for example, a compressive residual strain, a wet heat aging test property, a tearing strength, a fracture elongation, a rebound resilience, and so on) of the foam. Besides, it is possible to suppress viscosity increasing by delaying a reaction just after an injection into a mold without lowering final reactivity, and further to enable to lower a pressure when cells are communicated by a compressor, in manufacturing of the polyurethane foam. Accordingly, it is possible to drastically improve a manufacturing efficiency and to obtain a product of which properties are good in manufacturing of the polyurethane foam, in particular, the soft polyurethane foam.

EMBODIMENTS FOR CARRYING OUT THE INVENTION

Embodiments of the present invention are described. Note that the present invention is not limited to the following embodiments.

An expandable polyurethane composition of an embodiment of the present invention comprises (A) a polyisocyanate, (B) an active hydrogen containing compound including (B1) a polyol and (B2) water, and (C) a cross-linking agent composition. Hereinafter, each component is described in detail.

[(A) Polyisocyanate]

It is possible to use a publicly known organic isocyanate compound in an aliphatic series, an alicyclic series, and an aromatic series having two or more isocyanate groups, as the polyisocyanate (A). Alkylene diisocyanates or arylene diisocyanates such as hexamethylene diisocyanate, isophorone diisocyanate, 4,4-dicyclohexylmethane diisocyanate, 2,4- or 2,6-tolylene diisocyanate (toluene diisocyanate or toluidine diisocyanate: TDI), alkylene diisocyanate or arylene isocyanate such as 2,2'- or 2,4- or 4,4'-diphenylmethane diisocyanate (MDI), publicly known triisocyanate and polymeric MDI (crude diphenylmethane diisocyanate: called as crude MDI), and so on can be cited.

The preferable isocyanates to obtain a soft foam are generally a mixture of 2,4-TDI of 80 mass % and 2,6-TDI of 20 mass, a mixture of 2,4-TDI of 65 mass % and 2,6-TDI of 35 mass %, all of the polyisocyanates in MDI type, and a mixture of the above-stated TDI and MDI.

An amount of the polyisocyanate used for manufacturing of a foam is described as an "isocyanate index". The "isocyanate index" represents a percentile of the isocyanate group relative to an active hydrogen containing group capable of reacting with the isocyanate group, and it can be obtained by dividing an actual amount of the polyisocyanate used in a reaction mixture by a theoretically required stoichiometric amount of the polyisocyanate necessary to react with all of the active hydrogen, and centuplicating the result. In the embodiment of the present invention, the isocyanate index is not particularly limited, but generally, the manufacturing of the soft foam is within a range of 70 to 130.

[(B) Active Hydrogen Containing Compound]

The active hydrogen containing compound (B) contains the polyol (B1) and the water (B2).

The polyol (B1) is a compound having two or more active hydrogen containing functional groups such as a hydroxyl group capable of reacting with the isocyanate group of the (A) component in a molecule, and a publicly known one can be used. The preferable number of the active hydrogen containing functional groups (hydroxyl groups) of the polyol is from 2 to 8, and the most preferable number is from 2.3 to 6. Durability of the soft polyurethane foam becomes good when the number of the hydroxyl groups is two or more. Besides, the soft polyurethane foam does not become too hard, and mechanical physical property such as elongation becomes good when the average number of hydroxyl groups is set to be six or less.

As the compound having two or more hydroxyl groups, there are a polyether based polyol, a polyester based polyol, and so on. In particular, the one composed of only one kind or more of the polyether based polyol, or the one of which main constituent is the polyether based polyol, and the polyester based polyol, a polyhydric alcohol, a polyamine, an alkanolamine, the other active hydrogen containing compounds are used in combination is preferable.

The polyol which can be used in the embodiment of the present invention is not particularly limited, but it is preferable to use the one categorized into the following independently or by mixture.

1) Alkylene oxide adduct of polyhydroxy alkane
2) Alkylene oxide adduct of nonreducing sugar or sugar derivatives
3) Alkylene oxide adduct of phosphoric acid or polyphosphoric acid
4) Alkylene oxide adduct of a kind of polyphenol
5) Alkylene oxide adduct of primary or secondary amines The alkylene oxide adduct of the polyhydroxy alkane suitable for obtaining the soft foam is an ethylene oxide adduct of a trihydroxy alkane or a propylene oxide adduct of a trihydroxy alkane.

A grafted polyol or polymer polyol is one kind of polyol useful for the embodiment of the present invention, and it can be widely used for the manufacturing of the soft foam. The polymer polyol is a polyol containing a stable polymer dispersion (for example, fine particles of vinyl polymer) in the polyol among, for example, the above-stated polyols 1) to 5), more preferably the polyol 1).

In the embodiment, it is preferable that the one of which hydroxyl group value is 10 mgKOH/g to 120 mgKOH/g is used as the polyol (B1). The viscosity of the polyol does not become high and workability at the manufacturing time becomes good by setting the hydroxyl group value at 10 mgKOH/g or more. Besides, the durability of the soft polyurethane foam becomes good by setting the hydroxyl group value at 120 mgKOH/g or less. It is preferable to select the hydroxyl group value of the polyol depending on usages of the polyurethane foam.

As marketed products of the polyol (B1), for example, there are SANNIX FA-703 (glycerine-propyleneoxide/ethylene oxide adduct, hydroxyl group value of 33 mgKOH/g; manufactured by Sanyo Chemical Industries, Ltd.), SANNIX FA-728R (polymer polyol, hydroxyl group value of 28.5 mgKOH/g; manufactured by Sanyo Chemical Industries, Ltd.), ACTCOL PPG EP-901 (glycerine-propylene oxide/ethylene oxide adduct, hydroxyl group value of 24 mgKOH/g; manufactured by Mitsui Chemicals Inc.), ACTCOL POP-36/90 (polymer polyol, hydroxyl group value of 24 mgKOH/g; manufactured by Mitsui Chemicals Inc.), and so on.

The water (B2) is compounded as a chemical foaming agent, and the foam is formed with carbon dioxide gas generated by a reaction between the water (B2) and the isocyanate group of the polyisocyanate (A). At least 50% of gas volume forming the foam (namely, at least 50 volume % of total foaming gas) is preferable to be carbon dioxide generated by the reaction between the water (B2) and the isocyanate group of the polyisocyanate (A), and in particular, it is more preferable that 100% of the foaming gas volume is the carbon dioxide generated by the reaction between the water and the isocyanate group while using the water independently as the foaming agent. Namely, it is possible to use the chemical foaming agent and a physical foaming agent being an organic acid such as a formic acid in combination in addition to the water being the chemical foaming agent, but it is more preferable to make foam by using the water independently.

[(C) Cross-Linking Agent Composition]

The cross-linking agent composition (C) contains at least one kind of a cross-linking agent (C1) selected from an alkanolamine (a) and an aminosilane (b), and at least one kind of a carboxylic acid (C2).

The alkanolamine (a) being the cross-linking agent (C1) is represented by the following expression (1).

$$H_x R^1_y N((R^2O)_n H)_{3-x-y} \quad (1)$$

In the expression (1), the "$R^1$" represents a group selected from an alkyl group of which carbon number is 1 to 12, an aryl group, or an aralkyl group, and the "$R^2$" represents an alkyl group of which carbon number is 2 to 4. Besides, the "x" is an integer from "0" (zero) to 2, the "y" is an integer from "0" (zero) to 2, the "x+y" is an integer from "0" (zero) to 2, and the "n" is an integer from 1 to 10. When the "y" is two, two pieces of the "$R^1$" may be the same or different.

As the alkanolamine (a) as stated above, triethanolamine, triisopropanolamine, N-hexyldiethanolamine (N,N-diethanolhexylamine), N-methyldiethanolamine, diethanolamine, diisopropanolamine (N,N-diisopropanolamine), an alkylene oxide adduct of the above, and so on can be cited. A usage of an amine having two pieces of alkanol groups ("x"="0" (zero), "y"=1 or "x"=1, "y"="0" (zero) in the expression (1)), and "n" is an integer from 1 to 3 is preferable. More specifically, a usage of diisopropanolamine and/or N-hexyldiethanolamine is preferable.

The aminosilane (b) being the cross-linking agent (C1) is represented by the following expression (2).

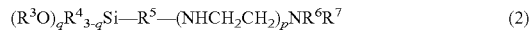
$$(R^3O)_q R^4_{3-q} Si\text{—}R^5\text{—}(NHCH_2CH_2)_p NR^6 R^7 \quad (2)$$

In the expression (2), the "$R^3$" represents an alkyl group of which carbon number is 1 to 6, the "$R^4$" represents a hydrogen group or a methyl group, the "$R^5$" represents a divalent hydrocarbon group of which carbon number is 1 to 10, and the "$R^6$" and the "$R^7$" represent a hydrogen group or a monovalent hydrocarbon group of which carbon number is 1 to 20, respectively. Besides, the "q" is an integer from "0" (zero) to 3, the "p" is an integer from "0" (zero) to 4. When the "q" is the integer of two or more, two pieces or more of the "$R^3$" may be the same or different.

As the aminosilane (b) as stated above, N-(β-aminoethyl)-γ-aminopropyltrimethoxysilane, N-(β-aminoethyl)-γ-aminopropyltriethoxysilane, N-(β-aminoethyl)-γ-aminopropyltriisopropoxysilane, N-(β-aminoethyl)-γ-aminopropylmethyldimethoxysilane, N-(β-aminoethyl)-γ-aminopropylmethyldiethoxysilane, N-(β-aminoethyl)-γ-aminopropylmethyldiisopropoxysilane, γ-aminopropyltrimethoxysilane, γ-aminopropyltriisopropoxysilane, γ-aminopropyldimethoxysilane, γ-aminopropyldiethoxysilane, γ-aminopropyldiisopropoxysilane, γ-aminopropylmethyldimethoxysilane, γ-aminopropylmethyldiethoxysilane, γ-aminopropylmethyldiisopropoxysilane, and so on can be cited.

As the cross-linking agent (C1) constituting the cross-linking agent composition (C), one kind from among the above-stated alkanolamine (a) and aminosilane (b) can be used independently, and two or more kinds can be used in combination.

The carboxylic acid being the (C2) component constituting the cross-linking agent composition (C) is represented by the following expression (3). A carboxyl group of the carboxylic acid (C2) reacts with an amino group held by the cross-linking agent (C1) to block a function of the amino group.

$$X_z\text{—}R^8(COOH)_m \quad (3)$$

In the expression, the "X" represents a group of one kind or more selected from a chlorine group, a fluorine group, a bromine group, and the hydroxyl group, and the "$R^8$" represents the hydrocarbon group. The "z" is an integer of one or more, and the "m" is an integer of one or more. As stated above, the carboxylic acid (C2) is the one in which mono- and polycarboxylic substitutions are performed at the "$R^8$" portion being the hydrocarbon group, but a single carbon atom does not have two pieces or more of X substituents. In general, each of the "m" and the "z" has a value of one, two, three or four independently.

The "$R^8$" is a saturated or unsaturated hydrocarbon group of which carbon number is 1 to 20, and contains an aliphatic hydrocarbon group in a linear chain state or a branched chain state, an alicyclic hydrocarbon group, or an aromatic hydrocarbon group. Namely, the "$R^8$" can be a linear or branched alkylene group of which carbon number is 1 to 20, a cyclic alkylene group of which carbon number is 4 to 10, an arylene group, an alkarylene group or an aralkylene group of which carbon number are 6 to 20. The alkylene group of which carbon number is 2 to 10 and the arylene group of which carbon number is 6 are the most preferable. More concrete examples of the "$R^8$" are, a methylene group, an ethylene group, a 1,1-propylene group, a 1,3-propylene group, a 1,2-propylene group, a 1,4-butylene group, a 1,1-amylene group, a 1,1-decylene group, a 2-ethyl-1,1-pentylene group, a 2-ethylhexylene group, a o-, m-, p-phenylene group, an ethyl-p-phenylene group, a 2,5-naphtylene group, a p,p'-biphenylene group, a cyclopentylene group, a cycloheptylene group, a xylene group, a 1,4-dimethylenephenylene group, and so on. These hydrocarbon groups have at least total of two usable substitution points, in which one for the carboxyl group, and one for the hydroxyl group or the halogen group, but it is possible to further substitute additional hydrogen group of the hydrocarbon group by the halogen group and/or the hydroxyl group and/or the carboxyl group.

As concrete examples of the carboxylic acid being the (C2) component, a salicylic acid, a benzilic acid, a hydroxybenzoic acid, a dihydroxybenzoic acid, a trihydroxybenzoic acid, a gluconic acid, a citric acid, a glycolic acid, a dimethylolpropionic acid, a malic acid, a lactic acid, a tartaric acid, a 2-hydroxymethylpropionic acid, a hydroxybutyric acid, a chloropropionic acid, a bromopropionic acid, a dichloropropionic acid, a dibromopropionic acid, a chloroacetic acid, a dichloroacetic acid, a bromoacetic acid, a dibromoacetic acid, a bromobutyric acid, a bromoisobutyric acid, a dichlorophenylacetic acid, a bromomalonic acid, a dibromosuccinic acid, a 3-chloro-2-hydroxypropionic acid, a dichlorophthalic acid, a chloromaleic acid, a fluorobenzoic acid, a chlorobenzoic acid, a bromobenzoic acid, a difluorobenzoic acid, a dichlorobenzoic acid, a dibromobenzoic acid, a dibromosalicylic acid, a 2-bromocaprylic acid, a 2-bromohexadecanoic acid, a 2,2-dichloro-1-methylpropionic acid, and so on can be cited. The one of which molecular weight is less than 300 is preferable, and more preferable to be less than 280.

In this embodiment, the cross-linking agent composition (C) can further contain 2-methyl-1,3-propanediol and/or polyoxyethylene glyceryl ether in addition to the carboxylic acid (C2) and the cross-linking agent (C1) as stated above. These components function as a chain extending agent or the cross-linking agent, and therefore, it is possible to improve the stability at the foam molding time, and to improve the physical properties (for example, tearing strength and so on) of the foam obtained finally.

A compounding ratio of the cross-linking agent composition (C) as stated above is 0.005 parts by mass to 20 parts by mass relative to 100 parts by mass of the active hydrogen containing compound (B). When the compounding ratio of the cross-linking agent composition (C) is less than 0.005 parts by mass, it is impossible to have enough effect on the improvement in the hardness of the foam and the suppression of the viscosity increasing of the composition. Besides, when the compounding ratio exceeds 20 parts by mass, it is not preferable because deterioration of the other physical properties occurs. A containing rate of the cross-linking agent (C1) in the cross-linking agent composition (C) is set to be 5 mass % to 90 mass %. Further, it is preferable to compound such that a content (the number of moles) of the cross-linking agent (C1) is more than a content (the number of moles) of the carboxylic acid (C2). Namely, it is preferable that a block rate of the amino group (the amino group held by the cross-linking agent (C1)) by the carboxyl group of the carboxylic acid (C2) is set to be not 100% but 5% to 80%.

It is possible to compound a catalyst and a foam adjusting agent in addition to the respective components of (A) to (C) to the expandable composition of the embodiment of the present invention, and further, it is possible to compound additives such as a filler, a stabilizer, a coloring agent, a fire retardant, and so on according to need. The catalyst is to accelerate a reaction between the isocyanate group in the polyisocyanate (A) and an active hydrogen containing group in the active hydrogen containing compound (B), and for example, kinds of a tertiary amine such as triethylenediamine, bis[(2-dimethylamino)ethyl]ether, N,N,N,N-tetramethylhexamethylenediamine, a carboxylic acid metal salt such as potassium acetate, 2-ethylhexanoic acid potassium, an organotin compound such as dibutyltindilaulate, stannousoctoate, and so on can be used. The foam adjusting agent is a surface active agent compounded to form good bubbles. As the foam adjusting agent, any one which is publicly known as the foam adjusting agent in polyurethane industries can be used. For example, there are a silicon based foam adjusting agent, a fluorine-containing compound based foam adjusting agent, and so on.

It is possible to manufacture the soft polyurethane foam by a one-shot foaming method using the expandable polyurethane composition of the embodiment as stated above. The "one-shot foaming method" is a method manufacturing the polyurethane foam in one stage. In this method, all of the components necessary for manufacturing the polyurethane foam containing the polyisocyanate, the polyol, the water, the cross-linking agent, the catalyst, the foam adjusting agent, an arbitrary selective foaming agent, and the others are blended together, poured into a moving conveyor or a mold in an adequate figure to be cured.

According to the expandable polyurethane composition of the embodiment of the present invention, it is possible to drastically improve manufacturing efficiency and to obtain the polyurethane foam of which physical properties are good in the manufacturing of the kinds of polyurethane, preferably the kinds of one-shot polyurethane, in particular, the soft polyurethane foam.

Hereinafter, concrete examples of the present invention are described.

Examples 1 to 8, Comparative Examples 1 to 6

Cross-linking agent compositions (a cross-linking agent-1 to a cross-linking agent-12) were prepared by respectively compounding diisopropanolamine and N-hexyldiethanolamine as the alkanolamine (a), γ-aminopropyltriethoxysilane as the aminosilane (b), various kinds of carboxylic acids (C2) illustrated in table 1,2-methyl-1,3-propanediol, and UNIOX G-450 (polyoxyethylene glycol (8) glyceryl ether: manufactured by NOF Corporation) with compositions illustrated in the table 1. When the cross-linking agent composition was prepared, the components other than the carboxylic acid (C2) were stirred to be mixed manually for three minutes at a room temperature, and thereafter, the carboxylic acid (C2) was added to be mixed little by little while taking for one minute. Note that diisopropanolamine (melting point: 44° C.) was mixed at the room temperature after it was completely made to be a liquid state by heating up to 60° C. In the table 1, a "part" represents a "part by mass".

TABLE 1

|  | [1] | [2] | [3] | [4] | [5] | [6] | [7] | [8] | [9] |
|---|---|---|---|---|---|---|---|---|---|
| Cross-linking agent-1 | Citric acid (50% aq.) | 15.2 | 18.5 | 18.5 | — | 18.5 | 29.3 | (7.6) | 50 mol % |
| Cross-linking agent-2 | Salicyclic acid | 17.8 | 20.0 | 20.0 | — | 20.0 | 22.2 | — | 50 mol % |
| Cross-linking agent-3 | Formic acid | 6.6 | 20.0 | 20.0 | — | 20.0 | 33.4 | — | 50 mol % |
| Cross-linking agent-4 | Lactic acid (90% aq.) | 14.1 | 19.7 | 19.7 | — | 19.7 | 26.8 | (1.4) | 50 mol % |
| Cross-linking agent-5 | Gluconic acid (50% aq.) | 40.3 | 16.0 | 16.0 | — | 16.0 | 11.7 | (20.2) | 50 mol % |
| Cross-linking agent-6 | 2-chloropropionic acid | 14.2 | 20.0 | 20.0 | — | 20.0 | 25.8 | — | 50 mol % |
| Cross-linking agent-7 | No additive | — | 20.0 | 20.0 | — | 20.0 | 40.0 | — | — |
| Cross-linking agent-8 | Lactic acid (90% aq.) | 14.8 | — | 39.4 | — | 19.7 | 26.1 | (1.5) | 50 mol % |
| Cross-linking agent-9 | No addtive | — | — | 40.0 | — | 20.0 | 40.0 | — | — |
| Cross-linking agent-10 | Lactic acid (90% aq.) | 10.6 | 39.6 | — | — | 19.8 | 30.0 | (1.1) | 50 mol % |
| Cross-linking agent-11 | No additive | — | — | — | 40.0 | 20.0 | 40.0 | — | — |

TABLE 1-continued

| | [1] | [2] | [3] | [4] | [5] | [6] | [7] | [8] | [9] |
|---|---|---|---|---|---|---|---|---|---|
| Cross-linking agent-12 | Lactic acid (90% aq.) | 8.9 | — | | 39.7 | 19.8 | 31.6 | (0.9) | 50 mol % |

[1] Kinds of acid
[2] Parts by mass of acid
[3] Parts by mass of N-hexyldiethanolamine
[4] Parts of mass of Diisopropanolamine
[5] Parts by mass of γ-aminopropyltriethoxysilane
[6] Parts by mass of 2-methy-1,3-propanediol
[7] Parts by mass of Uniox G-450
[8] Water (within composition)
[9] Block rate to amine Subsequently, the cross-linking agent-1 to the cross-linking agent-12 obtained as stated above, the polyisocyanate (A), the polyol (B1), the water (B2), the catalyst and the foam adjusting agent were respectively compounded with the compositions illustrated in table 2 and table 3, and mixed by a high speed mixer. The obtained compositions were immediately injected into an aluminum metal mold (inside dimension: 300 mm×300 mm×100 mm) of which temperature was adjusted to be 60° C.±2° C., a lid was closed, and it was retained as it was for five minutes for foam molding.

CORONATE 1021 (a blend isocyanate composed of TDI-80 of 80 mass % and CRUDE MDI of 20 mass %, isocyanate index of 95: manufactured by Nippon Polyurethane Industry Co., Ltd.) was used as the polyisocyanate (A), SANNIX FA-703 (glycerin-propylene oxide/ethylene oxide adduct, hydroxyl group value of 34 mgKOH/g: manufactured by Sanyo Chemical Industry Co., Ltd.) and SANNIX FA-728R (polymer polyol, hydrogen group value of 34 mgKOH/g: manufactured by Sanyo Chemical Industry Co., Ltd.) were used as the polyol (B1), NIAX CATALYST A-33 and NIAX CATALYST A-1 (both are manufactured by Momentive Performance Materials Japan Inc.) were used as the catalyst, UAX-6753 (silicon based foam adjusting agent: manufactured by Momentive Performance Materials Japan Inc.) was used as the foam adjusting agent.

Next, the foam was taken out of the metal mold, and the properties of the obtained polyurethane foam were respectively measured based on JIS K 6401 and JASOB 408-89 as for the hardness, a density (kg/cm³), the compressive residual strain (CS) (%) (50% compression), and the wet heat aging test (Wet set) (%) (50% compression). Besides, the fracture elongation (Eb) (%), the rebound resilience (BR) (%), and the tearing strength (Ts) (N/m) were also measured as for the polyurethane foams obtained in the examples 1 to 5. Further, a discharge time and a force-to-crush (FTC) were respectively measured by methods as described below. These results were illustrated in the table 2 and the table 3.

[Discharge Time]
A time (seconds) from the addition of the polyisocyanate (A) into the reaction mixture to a first appearance of the foam by being pushed out of four gas vent holes at an upper portion of the metal mold was measured as the discharge time.

[Force-to-Crush: FTC]
The FTC is a peak force required to compress the foam (foam pad) from an initial thickness to 50% thickness measured from the time when one minute has passed since the foam is taken out of the mold. A load tester of which settings were the same as the one used for the hardness measurement was used to measure. An FTC value is a good scale to evaluate communication ability of the foam, and the communication ability of the foam is high as the FTC value is low.

[Hardness Measurement]
The same pad as the one used as for the FTC measurement was measured after it was taken out of the mold and still stood for one day at the room temperature based on the hardness measurement of JIS K6401.

TABLE 2

| | E1 | E2 | E3 | E4 | E5 | CE1 | CE2 | CE3 |
|---|---|---|---|---|---|---|---|---|
| Composition (parts by mass) | | | | | | | | |
| Sannix FA-703 | 75.0 | 25.0 | 74.5 | 75.0 | 75.0 | 75.0 | 75.0 | 75.0 |
| Sannix FA-728R | 25.0 | 75.0 | 25.0 | 25.0 | 25.0 | 25.0 | 25.0 | 25.0 |
| Water | 3.36 | 3.4 | 3.392 | 3.274 | 3.4 | 3.4 | 3.4 | 3.4 |
| NiaX Catalyst A-33 | 0.4 | 0.4 | 0.4 | 0.4 | 0.4 | 0.4 | 0.4 | 0.4 |
| NiaX Catalyst A-1 | 0.1 | 0.1 | 0.1 | 0.1 | 0.1 | 0.1 | 0.1 | 0.1 |
| UAX-6753 | 1 | 1 | 1 | 1 | 1 | 1 | 1 | 1 |
| Cross-linking agent-1 | 0.54 | | | | | | | |
| Cross-linking agent-2 | | 0.5 | | | | | | |
| Cross-linking agent-3 | | | | | | | 0.5 | |
| Cross-linking agent-4 | | | 0.507 | | | | | |
| Cross-linking agent-5 | | | | 0.626 | | | | |
| Cross-linking agent-6 | | | | | 0.5 | | | |
| Cross-linking agent-7 | | | | | | | | 0.5 |
| Coronate 1021 (Index 95) | 42.00 | 42.05 | 42.13 | 42.90 | 41.85 | 39.79 | 41.95 | 42.03 |
| Density (kg/m³) | 41.0 | 41.1 | 41.2 | 41.4 | 40.9 | 40.9 | 41.3 | 41.4 |
| Discharge time | 55 | 62 | 58 | 59 | 61 | 48 | 51 | 45 |
| FTX (N) at 50% | 100 | 74 | 102 | 85 | 104 | 163 | 200 | 168 |
| Hardness (N) at 25% | 137 | 148 | 137 | 132 | 130 | 125 | 131 | 125 |
| Compressive residual strain CS(%) 50% compression | 7.3 | 7.6 | 7.0 | 7.1 | 7.2 | 6.9 | 7.0 | 6.3 |
| Wet heat aging test Wet set (%) 50% compression | 17.9 | 17.9 | 18.2 | 18.2 | 18.8 | 21.2 | 19.5 | 19.6 |

TABLE 2-continued

|  | E1 | E2 | E3 | E4 | E5 | CE1 | CE2 | CE3 |
|---|---|---|---|---|---|---|---|---|
| Fracture elongation Eb(%) | 167 | 182 | 175 | 176 | 182 | 181 | 162 | 184 |
| Rebound resilience BR(%) | 60.7 | 60.8 | 61.7 | 60.9 | 61.2 | 60.9 | 60.6 | 61.3 |
| Tearing strength Ts (N/m) | 96 | 99 | 100 | 100 | 92 | 87 | 96 | 99 |

E1 = Example 1;
E2 = Example 2;
E3 = Example 3;
E4 = Example 4;
E5 = Example 5;
CE1 = Comparative Example 1;
CE2 = Comparative Example 2;
CE3 = Comparative Example 3

TABLE 3

|  | E6 | E7 | E8 | CE4 | CE5 | CE6 |
|---|---|---|---|---|---|---|
| Composition (parts by mass) | | | | | | |
| Sannix FA-703 | 75.0 | 75.0 | 75.0 | 75.0 | 75.0 | 75.0 |
| Sannix FA-728R | 25.0 | 25.0 | 25.0 | 25.0 | 25.0 | 25.0 |
| Water | 5.292 | 5.295 | 5.295 | 5.3 | 5.3 | 5.3 |
| NiaX Catalyst A-33 | 0.6 | 0.6 | 0.6 | 0.6 | 0.6 | 0.6 |
| NizX Catalyst A-1 | 0.08 | 0.08 | 0.08 | 0.08 | 0.08 | 0.08 |
| UAX-6753 | 2 | 2 | 2 | 2 | 2 | 2 |
| Cross-linking agent-8 | 0.508 | | | | | |
| Cross-linking agent-9 | | | | | 0.5 | |
| Cross-linking agent-10 | | 0.505 | | | | |
| Cross-linking agent-11 | | | | | | 0.5 |
| Cross-linking agent-12 | | | 0.505 | | | |
| Coronate 1021 (Index 95) | 59.71 | 59.61 | 59.42 | 59.12 | 59.72 | 59.44 |
| Density (kg/m$^3$) | 28.3 | 28.1 | 28.3 | 28.0 | 28.4 | 28.2 |
| Discharge time (s) | 47 | 43 | 42 | 39 | 38 | 37 |
| FTC (N) at 50% | 434 | 457 | 427 | 491 | 481 | 551 |
| Hardness (N) at 25% | 96 | 93 | 94 | 92 | 91 | 90 |
| Compressive residual strain CS(%) 50% compression | 6.5 | 6.1 | 5.4 | 5.8 | 6.1 | 6.2 |
| Wet heat aging test Wet set (%) 50% compression | 20.0 | 21.0 | 19.8 | 21.1 | 18.6 | 20.9 |

E6 = Example 6;
E7 = Example 7;
E8 = Example 8;
CE4 = Comparative Example 4;
CE5 = Comparative Example 5;
CE6 = Comparative Example 6

As it can be seen from the measurement results in the table 2 and the table 3, in the polyurethane foams of the Examples 1 to 8 obtained by using the cross-linking agent-1 to the cross-linking agent 2, the cross-linking agent-4 to the cross-linking agent-6, the cross-linking agent-8, the cross-linking agent-10 and the cross-linking agent-12, the discharge time becomes longer, and the FTC is reduced in addition that the hardness is improved, compared to the polyurethane foams of the Comparative Example 1 and the Comparative Example 4 obtained without compounding the cross-linking agent and the polyurethane foams of the Comparative Examples 2 to 3, the Comparative Examples 5 to 6 obtained by using the cross-linking agent-3, the cross-linking agent-7, the cross-linking agent-9 and the cross-linking agent-11.

Besides, the compressive residual strain (CS) (%), the wet heat aging test (Wet set) (%) of the polyurethane foams of the Examples 1 to 8 have good values as same as the Comparative Examples 1 to 6. Further, it can be seen that the polyurethane foams obtained by the Examples 1 to 5 have the good mechanical properties (the fracture elongation (Eb), the rebound resilience (BR) and the tearing strength (Ts)) as same as the Comparative Examples 1 to 3.

What is claimed is:

1. An expandable polyurethane composition for a soft polyurethane foam, comprising:
   (A) a polyisocyanate;
   (B) an active hydrogen containing compound containing (B1) a polyol and (B2) water; and
   (C) a cross-linking agent composition for 0.1 parts by mass to 20 parts by mass relative to 100 parts by mass of the active hydrogen containing compound (B),
   wherein the cross-linking agent composition (C) comprises at least one kind of a cross-linking agent (C1) selected from an aminosilane (b),
   the aminosilane (b) being represented by an expression (2):

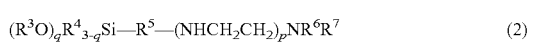

(in the expression, the "$R^3$" represents an alkyl group of which carbon number is one to six, the "$R^4$" represents a hydrogen group or a methyl group, the "$R^5$" represents a divalent hydrocarbon group of which carbon number is one to ten, and the "$R^6$" and the "$R^7$" represent a hydrogen group or a monovalent hydrocarbon group of which carbon number is one to 20; the "q" is an integer from "0" (zero) to three, the "p" is an integer from "0" (zero) to four); and at least one kind of a carboxylic acid (C2) represented by an expression (3):

$$X_z—R^8(COOH)_m \quad (3)$$

(in the expression, the "$R^8$" represents a hydrocarbon group, and the "X" represents a group selected from a chlorine group, a fluorine group, a bromine group, and a hydroxyl group; the "z" is an integer of one or more, and the "m" is an integer of one or more), and wherein a content (number of moles) of the cross-linking agent (C1) is larger than a content (number of moles) of the carboxylic acid (C2) in the cross-linking agent composition (C).

2. The expandable polyurethane composition according to claim 1,
wherein a content ratio of the cross-linking agent (C1) relative to a whole of the cross-linking agent composition (C) is 5 mass percent to 90 mass percent.

3. The expandable polyurethane composition according to claim 1,
wherein the aminosilane (b) is a silane having a γ-aminopropyl group or an N-(β-aminoethyl)-γ-aminopropyl group.

4. The expandable polyurethane composition according to claim 1,
wherein a molecular weight of the carboxylic acid (C2) is 300 or less.

5. The expandable polyurethane composition according to claim 4,
wherein the carboxylic acid (C2) is at least one selected from a salicylic acid, a lactic acid, a gluconic acid, and a 2-chloropropionic acid.

6. The expandable polyurethane composition according to claim 1,
wherein the cross-linking agent composition (C) further comprises 2-methyl-1,3-propanediol and/or polyoxyethylene glycol glyceryl ether.

7. The expandable polyurethane composition according to claim 1, wherein a block rate of the amino group of the cross-linking agent (C1) by the carboxyl group of the carboxylic acid (C2) is set to be 5% to 80%.

* * * * *